United States Patent
Kwasinski et al.

(10) Patent No.: US 9,444,358 B2
(45) Date of Patent: Sep. 13, 2016

(54) MULTIPLE-INPUT ISOLATED PUSH-PULL CONNECTED POWER CONVERTERS

(71) Applicant: Board of Regents, The University of Texas System, Austin, TX (US)

(72) Inventors: Alexis Kwasinski, Austin, TX (US); Sheng-Yang Yu, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 530 days.

(21) Appl. No.: 13/966,534

(22) Filed: Aug. 14, 2013

(65) Prior Publication Data
US 2015/0048681 A1    Feb. 19, 2015

(51) Int. Cl.
*H02M 3/335*    (2006.01)
*H02M 3/337*    (2006.01)

(52) U.S. Cl.
CPC ....... *H02M 3/3372* (2013.01); *H02M 3/33569* (2013.01); *Y10T 307/549* (2015.04)

(58) Field of Classification Search
CPC ......... H02M 3/33569; H02M 3/3372; H02M 3/372; Y10T 307/549
USPC .......................................................... 363/16
See application file for complete search history.

(56) References Cited

U.S. PATENT DOCUMENTS

| | | |
|---|---|---|
| 5,128,852 A | 7/1992 | Rettenmaier et al. |
| 6,205,036 B1 * | 3/2001 | Anzawa ................ H02J 7/0018 363/20 |
| 7,227,277 B2 | 6/2007 | Chapman et al. |
| 2012/0153729 A1 * | 6/2012 | Song ..................... H02J 7/0013 307/82 |

OTHER PUBLICATIONS

Atrash et al. "Boost-Integrated Phase-Shift Full-Bridge Converter for Three-Port Interface", 2007, IEEE.*
Liu et al. "A Systematic Approach to Synthesizing Multi-Input DC-DC Converters", 2009, IEEE.*
Tao et al. "Family of multiport bidirectional DC-DC converters" IEE Proc.-Electr. Power Appl. vol. 153, No. 3, May 2006.*
Yu et al. "A Multiple-Input Current-Source Converter for a Stand-Alone Hybrid Power System", IEEE, 2011.*
Tao et al., "Family of Multiport Bidirectional DC-DC Converters," IEEE Proceedings—Electric Power Applications, vol. 153, No. 3, pp. 451-458, May 1, 2006.

(Continued)

*Primary Examiner* — Jessica Han
*Assistant Examiner* — Lorena Bruner
(74) *Attorney, Agent, or Firm* — Robert A. Voigt, Jr.; Winstead, P.C.

(57) ABSTRACT

A multiple-input power converter transferring energy from multiple input sources to a load. The multiple-input power converter utilizes a push-pull converter that isolates loads from sources by a transformer in the output rectifier stage. The isolation increases the safety of the system and provides a wider range of sources-to-load voltage transfer ratios. Furthermore, the multiple-input power converter utilizes a lower number of components in comparison to previously designed multiple-input power converter topologies as well as has a lower control circuit implementation cost when compared to previously designed soft-switching multiple-input power converters.

12 Claims, 7 Drawing Sheets

(56) References Cited

OTHER PUBLICATIONS

Jang et al., "New Two-Inductor Boost Converter with Auxiliary Transformer," Applied Power Electronics Conference and Exposition, Seventeenth Annual IEEE, vol. 2, pp. 654-660, 2002.

Benavides et al., "Power Budgeting of a Multiple-Input Buck-Boost Converter," IEEE Transactions on Power Electronics, vol. 20, No. 6, pp. 1303-1309, Nov. 2005.

* cited by examiner

MULTIPLE-INPUT ISOLATED PUSH-PULL CONNECTED POWER CONVERTERS

TECHNICAL FIELD

The present invention relates generally to electrical power conversion, and more particularly to multiple-input isolated push-pull connected power converters that provide a wider range of sources-to-load voltage transfer ratios, a lower circuit implementation cost and contain a lower number of components in comparison to previously designed multiple-input power converter topologies.

BACKGROUND

Most electrical systems are supplied by one kind of energy source, e.g., batteries, wind energy, solar energy, or utility energy. Certain special cases are supplied by two sources, such as uninterruptible power supplies. Electrical systems would beneficially be supplied by energy sources of all kinds. Renewable sources are of particular interest, as resources are further distributed about the terrestrial power grid. In islanded power systems, interfacing of multiple sources allows for improved reliability, flexibility, and use of preferred energy sources. The different sources, such as photovoltaic cells, fuel cells, and batteries, generally have different voltage and current characteristics. In some cases, one source is preferential to others; in other cases, a simultaneous combination of sources is appropriate for energy or resource use. Typically, each different source requires a different power converter. As a result, a single-input power converter may be utilized for converting the energy of a particular power source. However, a system with multiple single-input power converters can become complex with a large number of energy sources. As a result, multiple-input power converters may be used to convert energy from multiple energy sources. By integrating all the energy sources through a single conversion device, the structure is simplified resulting in a low cost, unified control and compact system.

Multiple-input power converters can be divided into the following categories: time-sharing multiple-input power converters, multiple-input power converters with pulsating current source cells; multiple-input power converters with pulsating voltage source cells; multiple-input power converters with alternative pulsating current source cells; multiple-input power converters with alternative pulsating voltage source cells; multiple-winding magnetic coupled multiple-input power converters; and multiple-input direct-connected push-pull power converters. Unfortunately, energy conversion using such multiple-input power converters either involves the utilization of a significant number of components or limited voltage conversion ratios which result in significant switching losses, a reduction in converter efficiency, and a limit in the scope of multiple-input power converter applications.

BRIEF SUMMARY

In one embodiment of the present invention, a multiple-input power converter transferring energy from multiple input sources to a load comprises a first input voltage source connected in series with a first inductor, where the first inductor is serially connected with a first switch. The multiple-input power converter further comprises a second input voltage source connected in series with a second inductor, where the second inductor is serially connected with a second switch. The multiple-input power converter additionally comprises a first capacitor, where a terminal of the first switch is connected to the first capacitor. Furthermore, the multiple-input power converter comprises an output rectifier stage, where a terminal of the second inductor is connected to a first input port of the output rectifier stage and where the capacitor is serially connected with a second input port of the output rectifier stage. In addition, the multiple-input power converter comprises a load connected to an output port of the output rectifier stage.

In another embodiment of the present invention, a multiple-input power converter transferring energy from multiple input sources to a load comprises a first input voltage source connected in series with a primary winding of an auxiliary transformer, where the primary winding of the auxiliary transformer is serially connected with a first switch. The multiple-input power converter further comprises a second input voltage source connected in series with a secondary winding of the auxiliary transformer, where the secondary winding of the auxiliary transformer is serially connected with a second switch. The multiple-input power converter additionally comprises a first capacitor, where a terminal of the first switch is connected to the first capacitor. Furthermore, the multiple-input power converter comprises an output rectifier stage, where the secondary winding of the auxiliary transformer is connected to a first input port of the output rectifier stage and where the capacitor is serially connected with a second input port of the output rectifier stage. In addition, the multiple-input power converter comprises a load connected to an output port of the output rectifier stage.

In another embodiment of the present invention, a multiple-input power converter transferring energy from multiple input sources to a load comprises a first input voltage source connected in series with a first switch, where the first switch is serially connected with a first inductor. The multiple-input power converter further comprises a second input voltage source connected in series with a second switch, where the second switch is serially connected with a second inductor. The multiple-input power converter additionally comprises a first capacitor, where a terminal of the first inductor is connected to the first capacitor. Furthermore, the multiple-input power converter comprises an output rectifier stage, where a terminal of the second switch is connected to a first input port of the output rectifier stage and where the capacitor is serially connected with a second input port of the output rectifier stage. In addition, the multiple-input power converter comprises a load connected to an output port of the output rectifier stage.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

As stated in the Background section, multiple-input power converters can be divided into the following categories: time-sharing multiple-input power converters; multiple-input power converters with pulsating current source cells; multiple-input power converters with pulsating voltage source cells; multiple-input power converters with alternative pulsating current source cells; multiple-input power converters with alternative pulsating voltage source cells; multiple-winding magnetic coupled multiple-input power converters; and multiple-input direct-connected push-pull power converters. Unfortunately, energy conversion using such multiple-input power converters either involves the utilization of a significant number of components or limited voltage conversion ratios which result in significant switching losses, a reduction in converter efficiency, and a limit in the scope of multiple-input power converter applications.

The principles of the present invention provide a multiple-input power converter, specifically, a multiple-input power converter utilizing a push-pull converter that isolates loads from sources by a transformer in an output rectifier stage that results in a topology that provides a wider range of sources-to-load voltage transfer ratios, a lower circuit implementation cost and lower component numbers in comparison to previously designed multiple-input power converter topologies as discussed below in connection with FIGS. 1-14.

Figure 1:
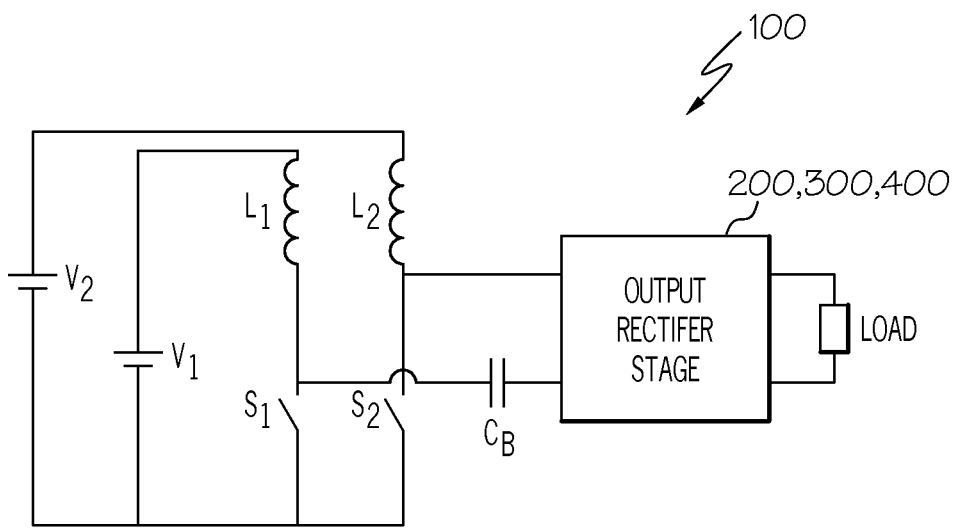
FIG. 1 illustrates a first type of a dual-input isolated push-pull connected boost power converter in accordance with an embodiment of the present invention.
Figure 2:
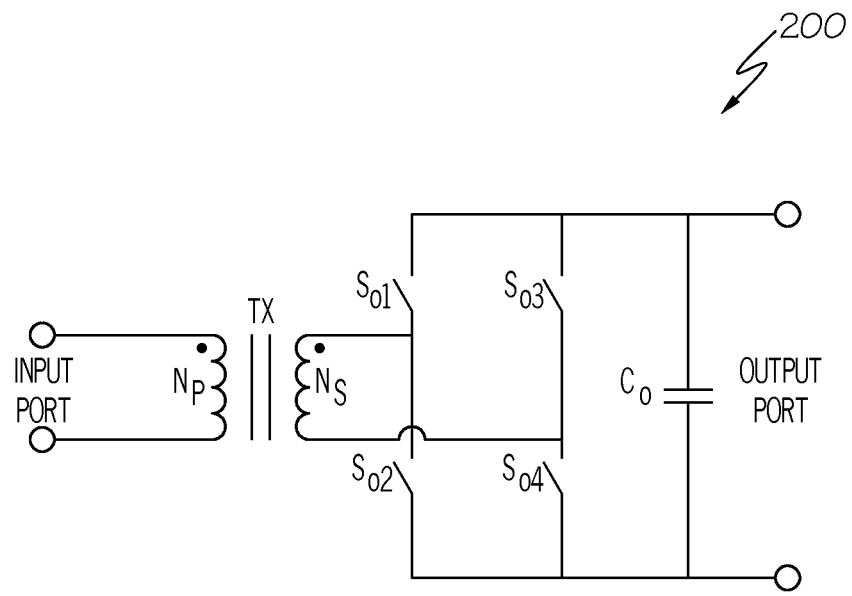
FIG. 2 illustrates a first type of an output rectifier stage in accordance with an embodiment of the present invention.
Figure 3:
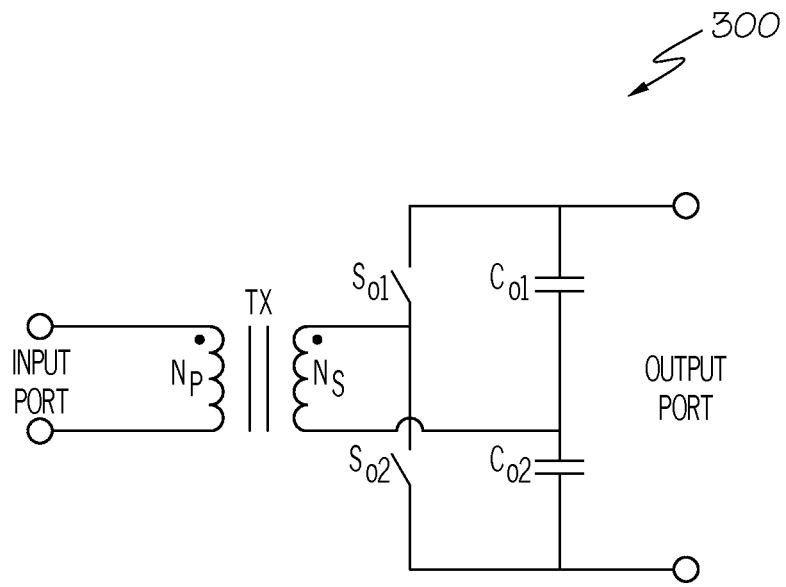
FIG. 3 illustrates a second type of the output rectifier stage in accordance with an embodiment of the present invention.
Figure 4:
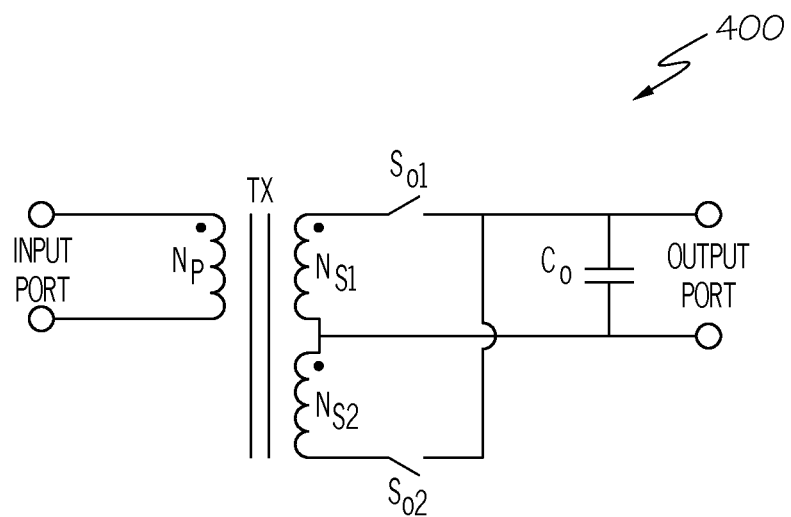
FIG. 4 illustrates a third type of the output rectifier stage in accordance with an embodiment of the present invention.
Figure 5:
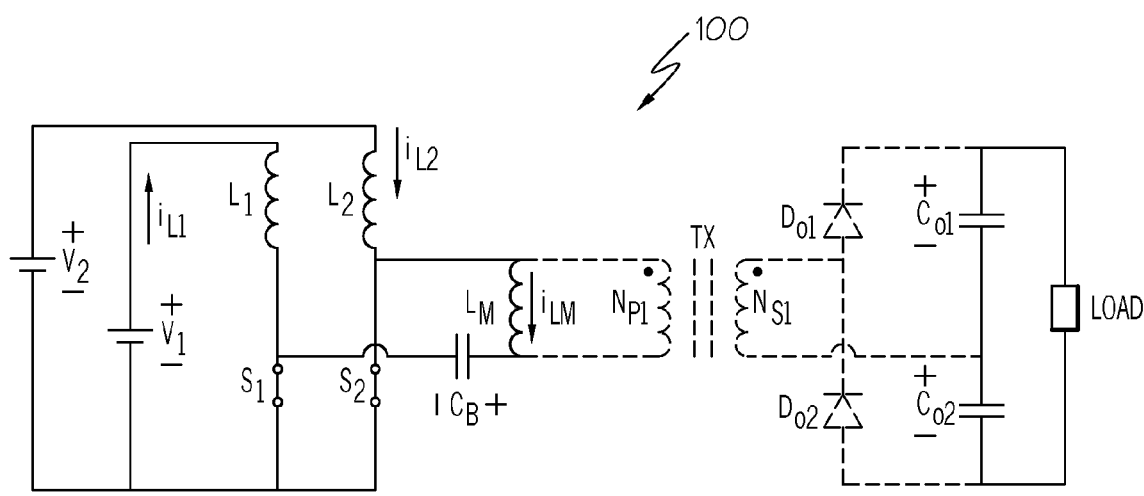
FIG. 5 illustrates a first operational state of the dual-input isolated push-pull connected boost power converter of a first type with an output rectifier stage of the second type in accordance with an embodiment of the present invention.
Figure 6:
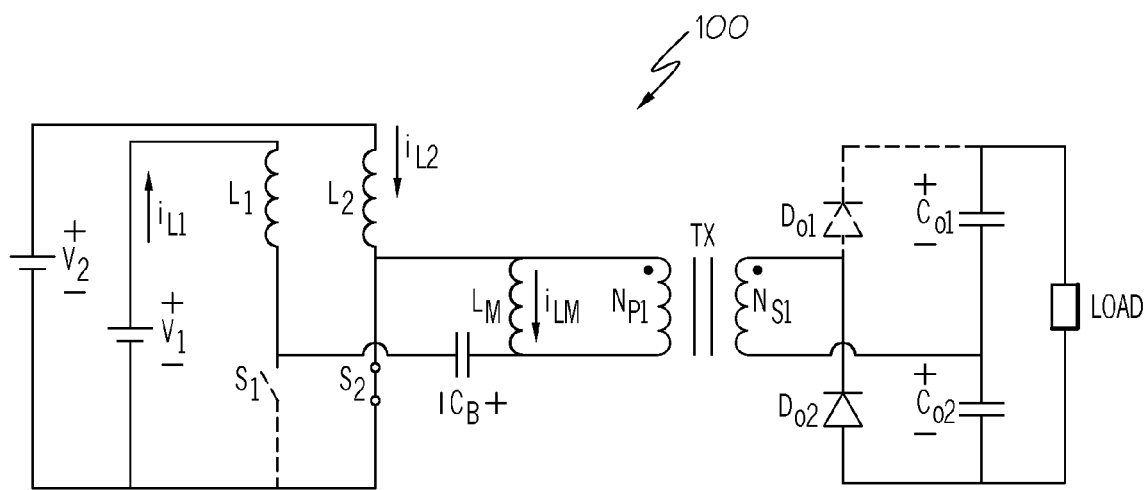
FIG. 6 illustrates a second operational state of the dual-input isolated push-pull connected boost power converter of a first type with an output rectifier stage of the second type in accordance with an embodiment of the present invention.
Figure 7:
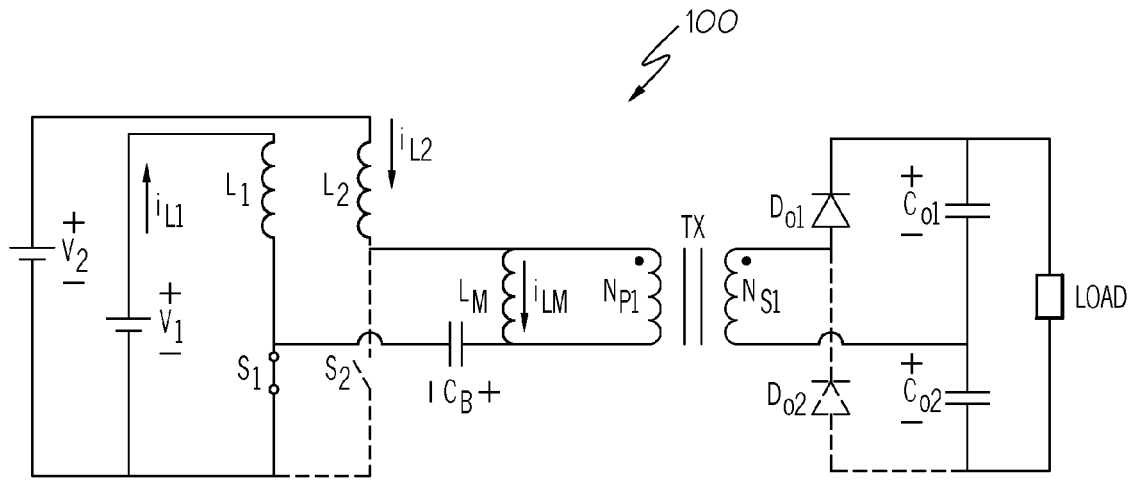
FIG. 7 illustrates a third operational state of the dual-input isolated push-pull connected boost power converter of a first type with an output rectifier stage of the second type in accordance with an embodiment of the present invention.
Figure 8:
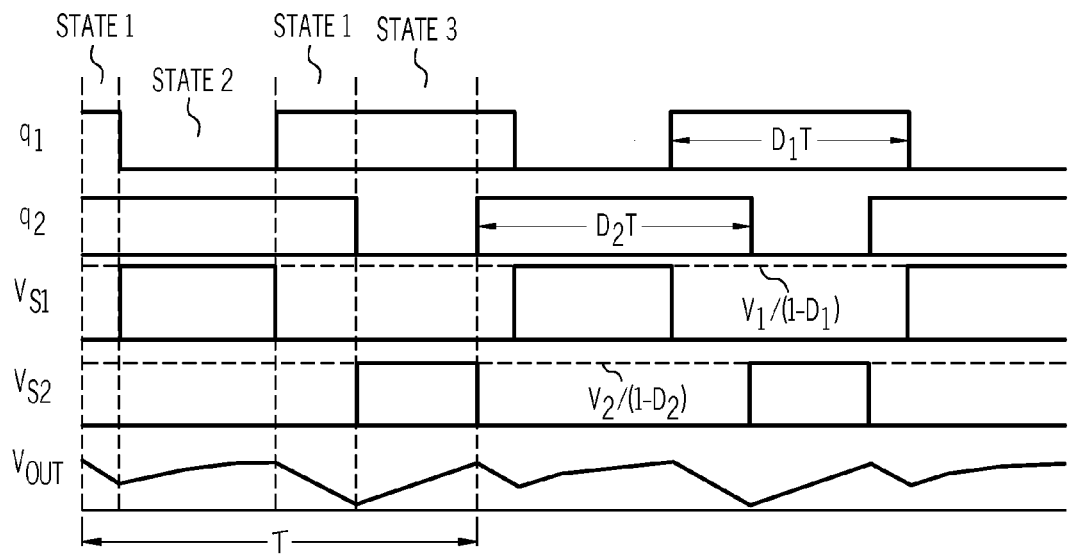
FIG. 8 illustrates the key waveforms of the dual-input isolated push-pull connected boost power converter of a first type with an output rectifier stage of the second type in accordance with an embodiment of the present invention.
Figure 9:
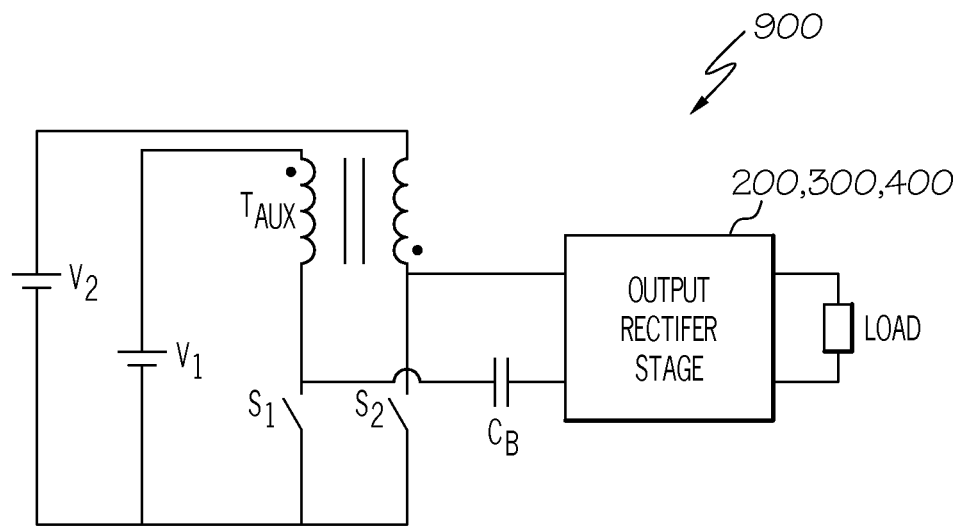
FIG. 9 illustrates a second type of the dual-input isolated push-pull connected boost power converter in accordance with an embodiment of the present invention.
Figure 10:
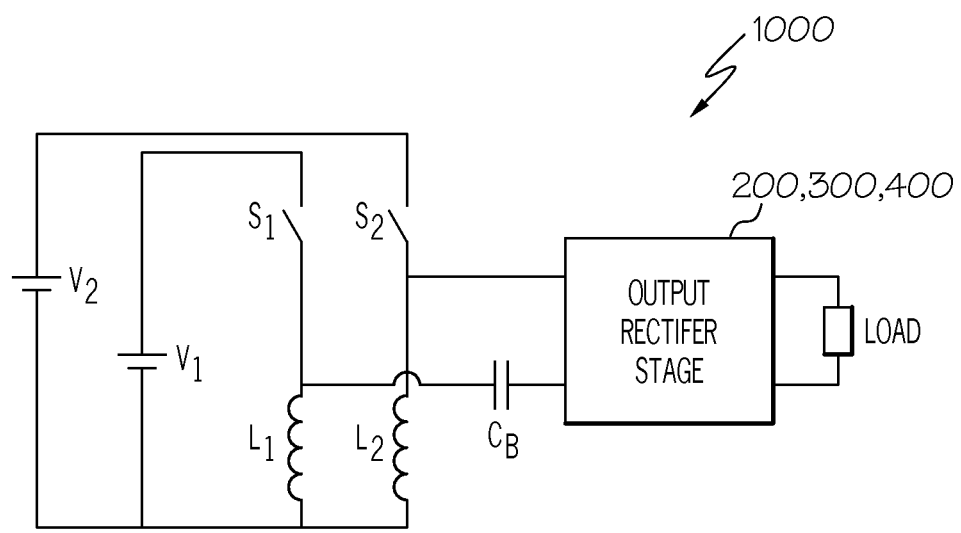
FIG. 10 illustrates a first type of a dual-input isolated push-pull connected buck-boost power converter in accordance with an embodiment of the present invention.
Figure 11:
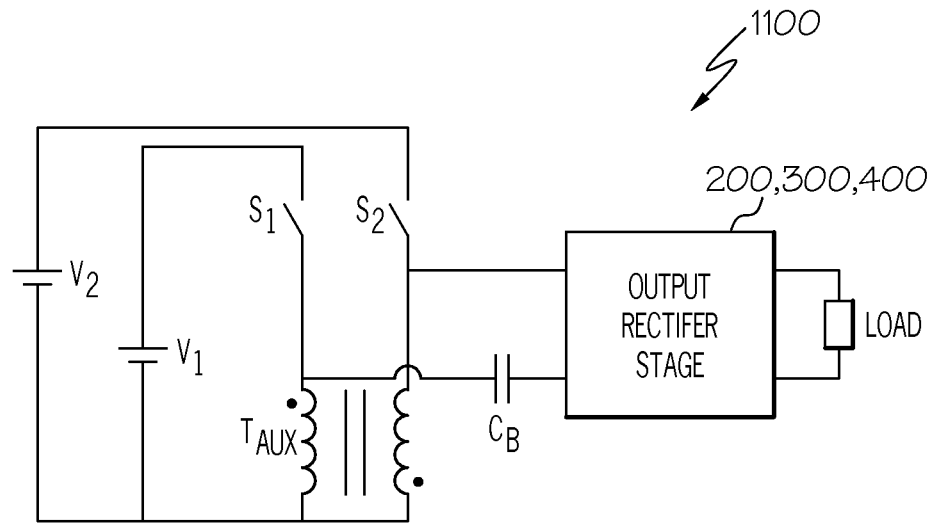
FIG. 11 illustrates a second type of the dual-input isolated push-pull connected buck-boost power converter in accordance with an embodiment of the present invention.
Figure 12:
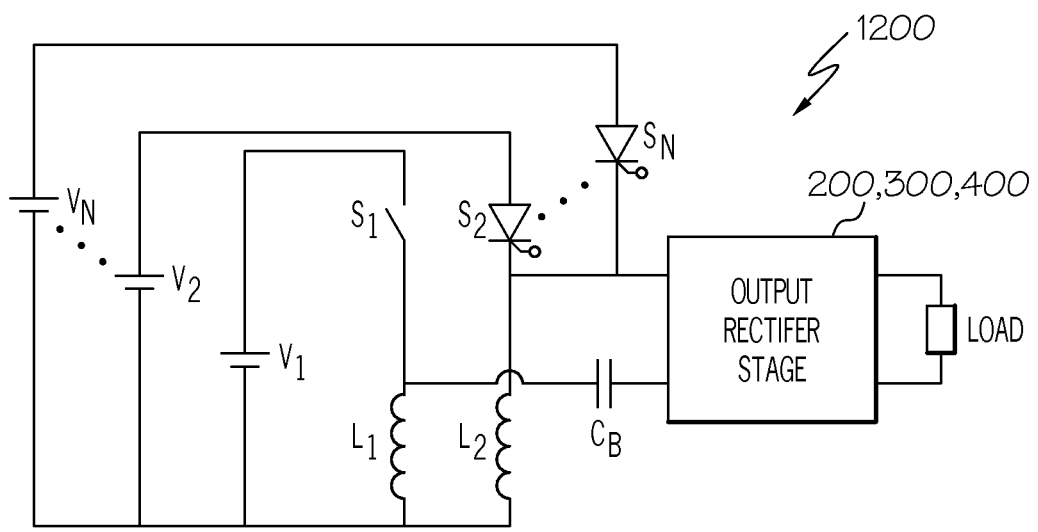
FIG. 12 illustrates a multiple-input isolated push-pull connected buck-boost power converter in accordance with an embodiment of the present invention.
Figure 13:
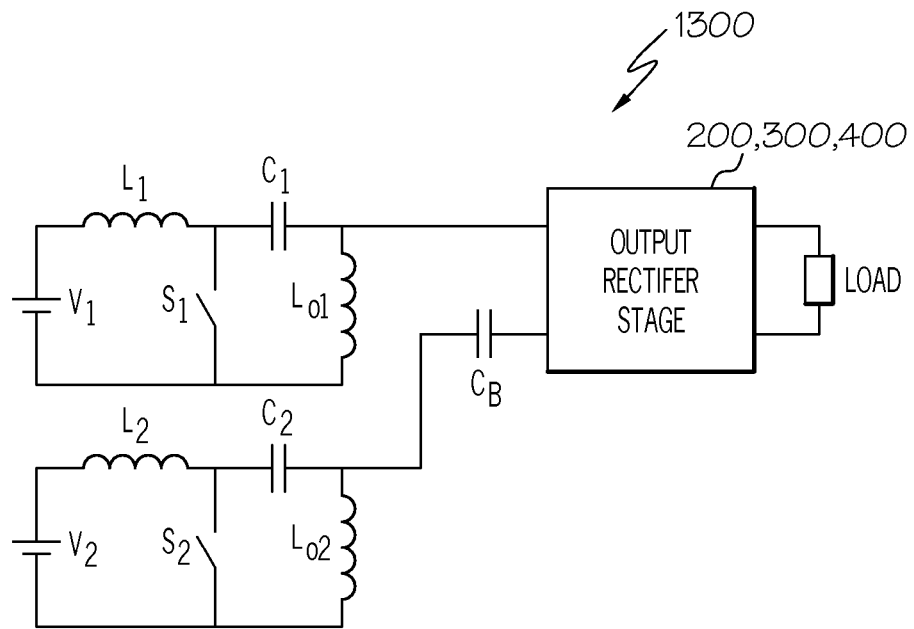
FIG. 13 illustrates a dual-input isolated push-pull connected single-ended primary-inductor power converter in accordance with an embodiment of the present invention.
Figure 14:
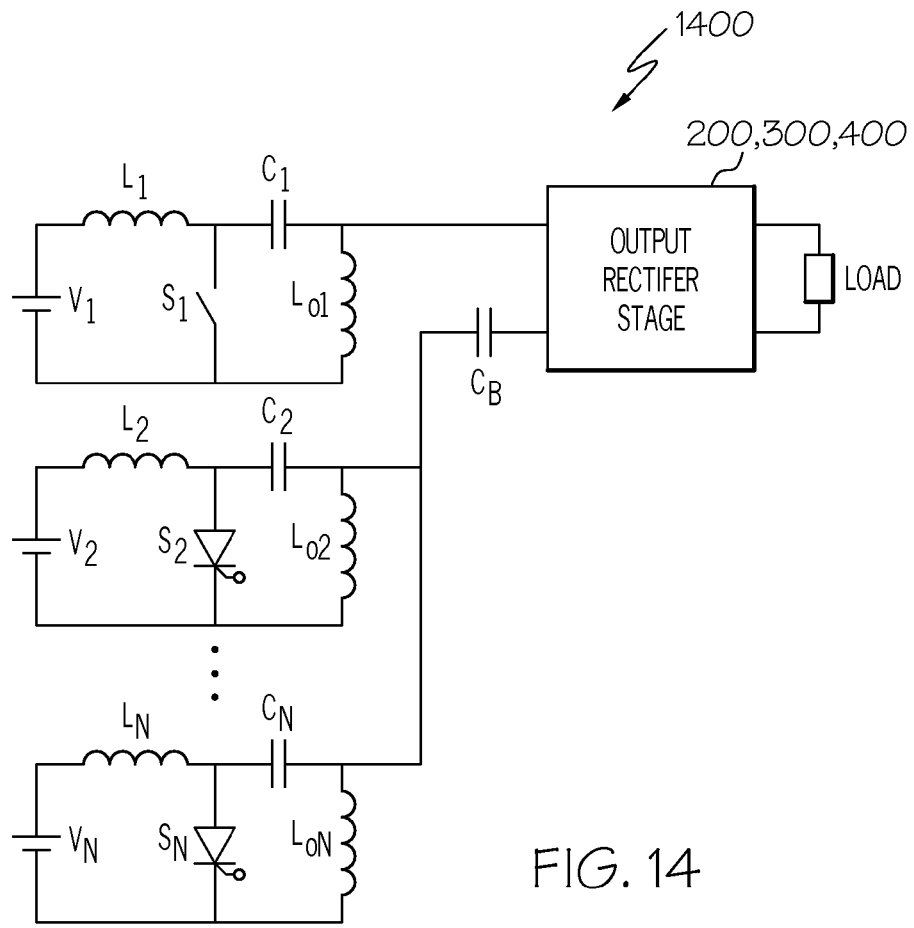
FIG. 14 illustrates a multiple-input isolated push-pull single-ended primary-inductor power converter in accordance with an embodiment of the present invention.

FIG. 1 illustrates a first type of a dual-input isolated push-pull connected boost power converter. FIG. 2 illustrates a first type of an output rectifier stage. FIG. 3 illustrates a second type of the output rectifier stage. FIG. 4 illustrates a third type of the output rectifier stage. FIG. 5 illustrates a first operational state of the dual-input isolated push-pull connected boost power converter of a first type with an output rectifier stage of the second type. FIG. 6 illustrates a second operational state of the dual-input isolated push-pull connected boost power converter of a first type with an output rectifier stage of the second type. FIG. 7 illustrates a third operational state of the dual-input isolated push-pull connected boost power converter of a first type with an output rectifier stage of the second type. FIG. 8 illustrates the key waveforms of the dual-input isolated push-pull connected boost power converter of a first type with an output rectifier stage of the second type. FIG. 9 illustrates a second type of a dual-input isolated push-pull connected boost power converter. FIG. 10 illustrates a first type of a dual-input isolated push-pull connected buck-boost power converter. FIG. 11 illustrates a second type of the dual-input isolated push-pull connected buck-boost power converter. FIG. 12 illustrates a multiple-input isolated push-pull connected buck-boost power converter. FIG. 13 illustrates a dual-input isolated push-pull connected single-ended primary-inductor power converter. FIG. 14 illustrates a multiple-input isolated push-pull single-ended primary-inductor power converter.

Referring now to the Figures in detail, FIG. 1 illustrates a first type of a dual-input isolated push-pull connected boost power converter 100 in accordance with an embodiment of the present invention. Converter 100 includes an input voltage source $V_1$ connected in series to inductor $L_1$ which is connected in series to switch $S_1$. Converter 100 further includes a second input voltage source $V_2$ connected in series to inductor $L_2$ which is connected in series to switch $S_2$. A terminal of inductor $L_2$ is connected to an input port of the output rectifier stage (one of three types) (discussed further below) and a terminal of inductor $L_1$ is connected to a capacitor $C_B$ which is connected to the other input port of the output rectifier stage (one of three types) (discussed further below). The output rectifier stage is connected to a load (identified as "Load" in FIG. 1).

Referring now to FIG. 2, in conjunction with FIG. 1, FIG. 2 illustrates a first type of an output rectifier stage 200 in accordance with an embodiment of the present invention. As shown in FIG. 2, the input ports of output rectifier stage 200 are coupled to the primary winding $N_p$ of transformer TX. Furthermore, as shown in FIG. 2, output rectifier stage 200 includes an output capacitor, $C_o$, connected in parallel to the output port as well as connected in parallel to the serially-connected switches $S_{o1}$ and $S_{o2}$ as well as connected in parallel to the serially-connected switches $S_{o3}$ and $S_{o4}$.

Electrically operated switches $S_{o1}$, $S_{o2}$, $S_{o3}$ and $S_{o4}$ may be implemented by diodes. The terminal of switch $S_{o1}$ and the terminal of switch $S_{o4}$ are connected to the secondary winding $N_S$ of transformer TX.

A second type of an output rectifier stage 300 is shown in FIG. 3 in accordance with an embodiment of the present invention.

Referring to FIG. 3, in comparison to output rectifier stage 200 of FIG. 2, output rectifier stage 300 includes serially-connected output capacitors ($C_{o1}$ and $C_{o2}$) as opposed to a single output capacitor $C_o$ in output rectifier stage 200.

A third type of an output rectifier stage 400 is shown in FIG. 4 in accordance with an embodiment of the present invention.

Referring to FIG. 4, in comparison to output rectifier stage 200 of FIG. 2, output rectifier stage 400 has output switches $S_{o1}$ and $S_{o2}$ connected to the secondary windings $N_{S1}$ and $N_{s2}$, respectively, of transformer TX. Switches $S_{o1}$ and $S_{o2}$ are serially-connected and are in series with output capacitor $C_o$ with is connected in parallel with the output port.

As illustrated in FIGS. 1-4, the load is isolated from the sources by a transformer, TX, in the output rectifier stage 200, 300, 400. This isolation can increase the safety of the system implementing the multiple-input power converter. Furthermore, converter 100 provides a wider range of a sources-to-load voltage transfer ratios which can be illustrated through the topology operational analysis provided below. For example, the Continuous Current Mode (CCM) operations of converter 100 with output rectifier stage 300 are shown in FIGS. 5-7. The related key waveforms are shown in FIG. 8, where $q_1$ and $q_2$ are driving signals for input switches, $S_1$ and $S_2$.

A first operational state of converter 100 with output rectifier stage 300 is shown in FIG. 5 in accordance with an embodiment of the present invention.

Referring to FIG. 5, in conjunction with FIGS. 1 and 3, in the first state, both input switches $S_1$ and $S_2$, are turned on, and both input inductors, $L_1$ and $L_2$, are energized by their respective input sources. Output switches $S_{o1}$ and $S_{o2}$ are electrically operated by output diodes, $D_{o1}$ and $D_{o2}$. The output diodes, $D_{o1}$ and $D_{o2}$, are reverse biased and energies in the output capacitors, $C_{o1}$ and $C_{o2}$, are discharged to the load.

A second operational state of converter 100 with output rectifier stage 300 is shown in FIG. 6 in accordance with an embodiment of the present invention.

Referring to FIG. 6, in conjunction with FIGS. 1 and 3, in the second state, input switch $S_2$ is turned on and input switch $S_1$ is turned off. The inductor energy in inductor $L_1$ is transferred to output capacitor $C_{o2}$ through output diode $D_{o2}$, while diode $D_{o1}$ remains reverse biased. Inductor $L_2$ is energized by input voltage source $V_2$ and the energy in output capacitor $C_{o1}$ is discharged to the load.

A third operational state of converter 100 with output rectifier stage 300 is shown in FIG. 7 in accordance with an embodiment of the present invention.

Referring to FIG. 7, in conjunction with FIGS. 1 and 3, in the third state, input switch $S_1$ is turned on and input switch $S_2$ is turned off. The inductor energy in inductor $L_2$ is transferred to output capacitor $C_{o1}$ through output diode $D_{o1}$. In the meantime, input voltage source $V_1$ continuously energizes inductor $L_1$ and the energy in output capacitor $C_{o2}$ discharges to the load. If a resistor, R, is applied as the load, the dynamic equations can be expressed as indicated in Equation (EQ 1):

$$L_1 \frac{di_{L1}}{dt} = V_1 - (1-q_1) \cdot (nv_{C1} + v_{CB}) \quad (1)$$

$$L_2 \frac{di_{L2}}{dt} = V_2 - (1-q_2) \cdot (nv_{C2} - v_{CB})$$

$$L_m \frac{di_{Lm}}{dt} = -(1-q_1-q_2) \cdot v_{CB} + (1-q_1) \cdot nv_{C1} - (1-q_2) \cdot nv_{C2}$$

$$C_B \frac{dv_{CB}}{dt} = (1-q_1-q_2) \cdot i_{Lm} + (1-q_1) \cdot i_{L1} - (1-q_2) \cdot i_{L2}$$

$$C_1 \frac{dv_{C1}}{dt} = -\frac{v_{C1}+v_{C2}}{R} + (1-q_1) \cdot [n \cdot (i_{L1} - i_{Lm})]$$

$$C_2 \frac{dv_{C2}}{dt} = -\frac{v_{C1}+v_{C2}}{R} + (1-q_2) \cdot [n \cdot (i_{L2} + i_{Lm})]$$

where n is the "turns ratio" of winding $N_{P1}$ to winding $N_{S1}$. When zero rippled is assumed to inductor currents and capacitor voltages and the fast average method is applied, the capacitor equilibrium voltages can be found as shown in equation (EQ 2):

$$V_{C1} = \frac{[V_{CB} + V_1/(1-D_1)]}{n} = \frac{[V_2 + D_1 V_1/(1-D_1)]}{n} \quad (2)$$

$$V_{C2} = \frac{[-V_{CB} + V_2/(1-D_2)]}{n} = \frac{[V_1 + D_2 V_2/(1-D_2)]}{n}$$

$$V_{CB} = V_1 - V_2$$

where $D_1$ and $D_2$ are the duty cycles for input switches $S_1$ and $S_2$. The output/load voltage is the sum of the two output capacitor voltages. Therefore, the sources-to-load voltage relationship can be represented as shown in equation (EQ 3):

$$V_{out} = V_{C1} + V_{C2} = \frac{V_1}{n(1-D_1)} + \frac{V_2}{n(1-D_2)} \quad (3)$$

Previously designed multiple-input push-pull power converters do not have the factor of a "turns ratio" in their own sources-to-load voltage relationship, which means that the ranges of the sources-to-load voltage transfer ratios in these previously designed multiple-input power converters are limited by the duty cycle limitations.

Experimental results of converter 100 are shown in FIG. 8 in accordance with an embodiment of the present invention with R=105Ω, $C_B$=2.2 µF, $C_{o1}$=$C_{o2}$=560 µF, n=0.5, and $L_1$=$L_2$=320 µH. The input and output conditions of the experiment are $V_1$=19V, $D_1$=0.5, $I_{L1}$=5.85 A, $V_2$=13.7V, $D_2$=0.625, $I_{L2}$=8.07 A, $V_{Load}$=146, and $I_{Load}$=1.38 A. High inputs-to-output voltage transfer ratios and high efficiency are observed in the experimental results. Moreover, the topologies of the present invention have lower component numbers when compared to previously designed soft-switching and isolated multiple-input power converters thereby providing a cost effective alternative. In other words, the cost of the topologies of the present invention could be lower than previously designed isolated multiple-input power converters.

Other topologies of the present invention (FIGS. 9-14) implementing the principles of the present invention also provide a wider range of sources-to-load voltage transfer ratios, a lower circuit implementation cost and lower component numbers in comparison to previously designed multiple-input power converter topologies as discussed below.

A second type of a dual-input isolated push-pull connected boost power converter 900 is shown in FIG. 9 in accordance with an embodiment of the present invention.

Referring to FIG. 9, in comparison to converter 100 of FIG. 1, converter 900 includes an auxiliary transformer $T_{AUX}$ (as opposed to the primary transformer) in replace of inductors $L_1$ and $L_2$. The input voltage source $V_1$ is connected to the primary winding of auxiliary transformer $T_{AUX}$ and the input voltage source $V_2$ is connected to the secondary winding of auxiliary transformer $T_{AUX}$. The secondary winding of auxiliary transformer $T_{AUX}$ is connected to the input port of output rectifier stage 200, 300, 400 (FIGS. 2-4).

A first type of a dual-input isolated push-pull connected buck-boost power converter 1000 is shown in FIG. 10 in accordance with an embodiment of the present invention.

Referring to FIG. 10, in comparison to converter 100 of FIG. 1, converter 1000 includes a reversal of the layout of input switches $S_1$, $S_2$ and inductors $L_1$, $L_2$. The terminal of input switch $S_2$ is now connected to the input port of output rectifier stage 200, 300, 400 (FIGS. 2-4). Furthermore, the terminal of inductor $L_1$ is now connected to capacitor $C_B$.

A second type of a dual-input isolated push-pull connected buck-boost power converter 1100 is shown in FIG. 11 in accordance with an embodiment of the present invention.

Referring to FIG. 11, in comparison to converter 1000 of FIG. 10, converter 1100 replaces inductors $L_1$ and $L_2$ with auxiliary transformer $T_{AUX}$ (as opposed to the primary transformer).

A multiple-input isolated push-pull connected buck-boost power converter 1200 is shown in FIG. 12 in accordance with an embodiment of the present invention.

Referring to FIG. 12, converter 1200 includes multiple levels of input voltage sources $V_1 \ldots V_N$, where N is a positive integer number. Input voltage source $V_1$ is connected in series with input switch $S_1$ with is connected in series with inductor $L_1$. The terminal of inductor $L_1$ is connected to an input capacitor $C_B$, which is connected to the input port of output rectifier stage 200, 300, 400 (FIGS. 2-4), whose output is connected to a load. Input voltage source $V_2$ is connected in series with a forward conducting and bidirectional blocking (FCBB) switch $S_2$ (operated by a Silicon Controlled Rectifier (SCR)) which is connected in series with inductor $L_2$. The terminal of switch $S_2$ is connected to the input port of output rectifier stage 200, 300, 400. Input voltage sources $V_3 \ldots V_N$ are connected in series with a FCBB switch $S_3 \ldots S_N$ (operated by a SCR), where N is a positive integer number, and where the terminal of each switch $S_3 \ldots S_N$ is connected to the input port of output rectifier stage 200, 300, 400.

A dual-input isolated push-pull connected single-ended primary-inductor power converter 1300 is shown in FIG. 13 in accordance with an embodiment of the present invention.

Referring to FIG. 13, converter 1300 includes a first voltage source $V_1$ connected in series with inductor $L_1$ which is connected in series with switch $S_1$ and capacitor $C_1$. Capacitor $C_1$ is connected in series with inductor $L_{o1}$, which are both connected to an input port of output rectifier stage 200, 300, 400 (FIGS. 2-4), whose output is connected to a load. Converter 1300 further includes a second voltage source $V_2$ connected in series with inductor $L_2$ which is connected in series with switch $S_2$ and capacitor $C_2$. Capacitor $C_2$ is connected in series with inductor $L_{o2}$, which are both connected in series with capacitor $C_B$, which is connected to the other input port of output rectifier stage 200, 300, 400.

A multiple-input isolated push-pull single-ended primary-inductor power converter 1400 is shown in FIG. 14 in accordance with an embodiment of the present invention.

Referring to FIG. 14, in comparison to converter 1300 of FIG. 13, converter 1400 includes multiple levels of input voltage sources $V_2 \ldots V_N$, where N is a positive integer number, connected in series with inductors $L_2 \ldots L_N$, which is connected in series with FCBB switches $S_2 \ldots S_N$ (operated by a SCR) and capacitors $C_2 \ldots C_N$. Capacitors $C_2 \ldots C_N$ are connected in series with inductors $L_{o2} \ldots L_{oN}$, which are both connected in series with capacitor $C_B$, which is connected to the input port of output rectifier stage 200, 300, 400.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A multiple-input power converter transferring energy from multiple input sources to a load, the multiple-input power converter comprising:
 a first input voltage source connected in series with a first inductor, wherein said first inductor is serially connected with a first switch;
 a second input voltage source connected in series with a second inductor, wherein said second inductor is serially connected with a second switch;
 a first capacitor, wherein a terminal of said first switch is connected to said first capacitor;
 an output rectifier stage, wherein a terminal of said second inductor is connected to a first input port of said output rectifier stage, wherein said capacitor is serially connected with a second input port of said output rectifier stage, wherein said first and second input ports are connected to a primary winding of a single transformer of said output rectifier stage; and
 a load connected to an output port of said output rectifier stage.

2. The multiple-input power converter as recited in claim 1, wherein said output rectifier stage comprises:
 a second capacitor connected in parallel to said output port;
 a third and a fourth switch serially-connected, wherein said third and fourth switches are connected in parallel with said output port; and
 a fifth and a sixth switch serially-connected, wherein said fifth and sixth switches are connected in parallel with said output port;
 wherein a terminal of said third switch and a terminal of said sixth switch are connected to a secondary winding of said transformer.

3. The multiple-input power converter as recited in claim 1, wherein said output rectifier stage comprises:
 a third and a fourth switch serially-connected, wherein said third and fourth switches are connected in parallel with said output port; and
 a second and a third capacitor serially-connected, wherein said second and third capacitors are connected in parallel with said output port;

wherein a terminal of said third switch and a terminal of said third capacitor are connected to a secondary winding of said transformer.

4. The multiple-input power converter as recited in claim 1, wherein said output rectifier stage comprises:
a second capacitor connected in parallel to said output port; and
a third and a fourth switch serially-connected, wherein said third and fourth switches are in series with said second capacitor;
wherein said third and fourth switches are connected to secondary windings of said transformer.

5. A multiple-input power converter transferring energy from multiple input sources to a load, the multiple-input power converter comprising:
a first input voltage source connected in series with a primary winding of an auxiliary transformer, wherein said primary winding of said auxiliary transformer is serially connected with a first switch;
a second input voltage source connected in series with a secondary winding of said auxiliary transformer, wherein said secondary winding of said auxiliary transformer is serially connected with a second switch;
a first capacitor, wherein a terminal of said first switch is connected to said first capacitor;
an output rectifier stage, wherein said secondary winding of said auxiliary transformer is connected to a first input port of said output rectifier stage, wherein said capacitor is serially connected with a second input port of said output rectifier stage; and
a load connected to an output port of said output rectifier stage.

6. The multiple-input power converter as recited in claim 5, wherein said output rectifier stage comprises:
said first and second input ports connected to a primary winding of a transformer;
a second capacitor connected in parallel to said output port;
a third and a fourth switch serially-connected, wherein said third and fourth switches are connected in parallel with said output port; and
a fifth and a sixth switch serially-connected, wherein said fifth and sixth switches are connected in parallel with said output port;
wherein a terminal of said third switch and a terminal of said sixth switch are connected to a secondary winding of said transformer.

7. The multiple-input power converter as recited in claim 5, wherein said output rectifier stage comprises:
said first and second input ports connected to a primary winding of a transformer;
a third and a fourth switch serially-connected, wherein said third and fourth switches are connected in parallel with said output port; and
a second and a third capacitor serially-connected, wherein said second and third capacitors are connected in parallel with said output port;
wherein a terminal of said third switch and a terminal of said third capacitor are connected to a secondary winding of said transformer.

8. The multiple-input power converter as recited in claim 5, wherein said output rectifier stage comprises:
said first and second input ports connected to a primary winding of a transformer;
a second capacitor connected in parallel to said output port; and
a third and a fourth switch serially-connected, wherein said third and fourth switches are in series with said second capacitor;
wherein said third and fourth switches are connected to secondary windings of said transformer.

9. A multiple-input power converter transferring energy from multiple input sources to a load, the multiple-input power converter comprising:
a first input voltage source connected in series with a first switch, wherein said first switch is serially connected with a first inductor;
a second input voltage source connected in series with a second switch, wherein said second switch is serially connected with a second inductor;
a first capacitor, wherein a terminal of said first inductor is connected to said first capacitor;
an output rectifier stage, wherein a terminal of said second switch is connected to a first input port of said output rectifier stage, wherein said capacitor is serially connected with a second input port of said output rectifier stage, wherein said first and second input ports are connected to a primary winding of a single transformer of said output rectifier stage; and
a load connected to an output port of said output rectifier stage.

10. The multiple-input power converter as recited in claim 9, wherein said output rectifier stage comprises:
a second capacitor connected in parallel to said output port;
a third and a fourth switch serially-connected, wherein said third and fourth switches are connected in parallel with said output port; and
a fifth and a sixth switch serially-connected, wherein said fifth and sixth switches are connected in parallel with said output port;
wherein a terminal of said third switch and a terminal of said sixth switch are connected to a secondary winding of said transformer.

11. The multiple-input power converter as recited in claim 9, wherein said output rectifier stage comprises:
a third and a fourth switch serially-connected, wherein said third and fourth switches are connected in parallel with said output port; and
a second and a third capacitor serially-connected, wherein said second and third capacitors are connected in parallel with said output port;
wherein a terminal of said third switch and a terminal of said third capacitor are connected to a secondary winding of said transformer.

12. The multiple-input power converter as recited in claim 9, wherein said output rectifier stage comprises:
a second capacitor connected in parallel to said output port; and
a third and a fourth switch serially-connected, wherein said third and fourth switches are in series with said second capacitor;
wherein said third and fourth switches are connected to secondary windings of said transformer.

* * * * *